United States Patent

Moffitt, Jr. et al.

[11] Patent Number: 5,865,077
[45] Date of Patent: Feb. 2, 1999

[54] FLOATING, NON-CONDUCTIVE HAND TOOLS

[75] Inventors: Frank A.. Moffitt, Jr., Pearland; Allen K. Groseth, Brazoria, both of Tex.

[73] Assignee: Zoo Plastix LLC, Pearland, Tex.

[21] Appl. No.: 722,807

[22] Filed: Sep. 27, 1996

[51] Int. Cl.⁶ .................................................. B25B 7/00
[52] U.S. Cl. ........................... 81/427.5; 81/489; 81/418; 81/177.1
[58] Field of Search ................... 81/427.5, 489, 81/177.1, 418; 7/106

[56] References Cited

U.S. PATENT DOCUMENTS

| | | | |
|---|---|---|---|
| 1,942,492 | 1/1934 | Ratigan | 81/177.1 |
| 3,675,359 | 7/1972 | Ohno | 81/427.5 |
| 4,023,450 | 5/1977 | Ygfors . | |
| 4,185,523 | 1/1980 | Kreitz | 81/417 |
| 4,198,749 | 4/1980 | Nordin | 30/192 |
| 4,208,749 | 6/1980 | Hermann et al. | 7/106 |
| 4,470,150 | 9/1984 | Sayer . | |
| 4,498,860 | 2/1985 | Gahan . | |
| 4,651,598 | 3/1987 | Warheit . | |
| 4,824,732 | 4/1989 | Hendry et al. . | |
| 4,923,666 | 5/1990 | Yamazaki et al. . | |
| 4,923,667 | 5/1990 | Sayer . | |
| 5,060,543 | 10/1991 | Warheit . | |
| 5,207,012 | 5/1993 | Lael | 7/106 |
| 5,351,584 | 10/1994 | Warheit . | |

*Primary Examiner*—James G. Smith
*Assistant Examiner*—Lee Wilson
*Attorney, Agent, or Firm*—Sheridan Ross P.C.

[57] ABSTRACT

A floating, non-conductive hand tool such as pliers or channel locks for use by those working proximate to water or an electrical source. The tools are extremely durable, lightweight, and have an internal cavity capable of holding a gas or a light weight polymer foam material to substantially reduce the overall density of the hand tool. Alternatively, the handle ends of the tool may be encased with a low density sheathing material used either independently or in conjunction with the aforementioned internal cavity to reduce the density of the tool.

23 Claims, 3 Drawing Sheets

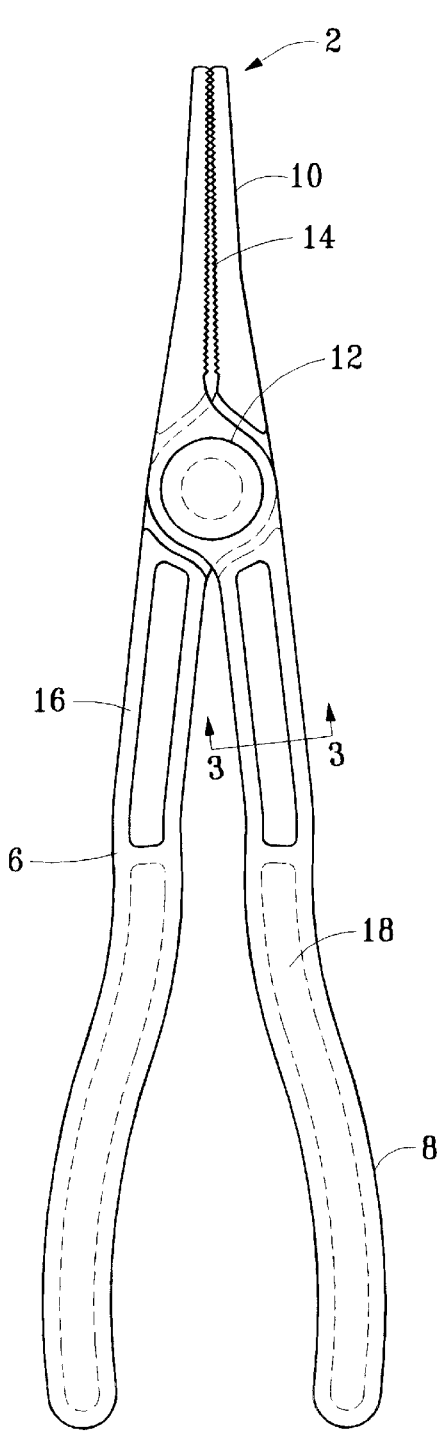
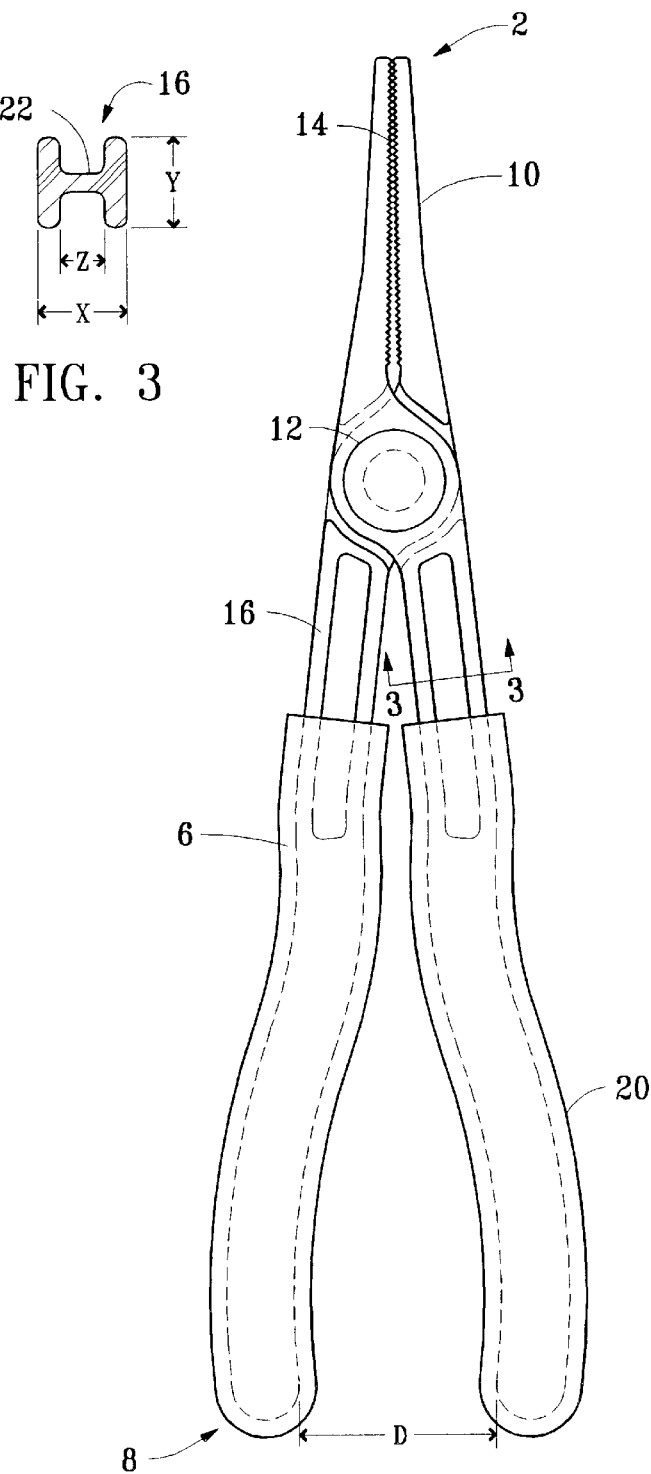
FIG. 1
FIG. 3
FIG. 2

FLOATING, NON-CONDUCTIVE HAND TOOLS

FIELD OF THE INVENTION

The present invention relates to lightweight, non-conductive hand tools and more specifically pliers for use by fishermen, electricians and others working near water or an electrical source. The pliers are constructed of a durable plastic, fiberglass or Verton®-type material which provides exceptional strength and durability. The tools have a low density as a result of a gas or foam filled cavity located within a handle portion of the tool, or alternatively by the attachment of a low density foam material positioned around the gripping portion of the tool.

BACKGROUND OF THE INVENTION

Hand held tools such as pliers, channel locks and screwdrivers are commonly used by carpenters, electricians, fishermen, mechanics and homeowners. Unfortunately, these types of tools are generally constructed of a metal material such as steel and may or may not include some form of insulated handle or covering made of a non-conductive material such as plastic or rubber. Thus, when used around any type of electrical source, the tools are capable of conducting electricity and causing severe electrical shock or electrocution.

Furthermore, for fishermen, offshore oil workers and others working or enjoying recreational activities around water, whenever these expensive tools are inadvertently dropped into water, they quickly sink and are rarely retrieved. Additionally, metal tools often rust or corrode when used near water or in locations of high humidity. Although plastic hand held fishing pliers, such as those found in U.S. Pat. No. 4,185,523 have previously been developed, these pliers lack the durability and strength required to be used in industrial applications. Furthermore, the plastic pliers float only as a result of a burdensome styrofoam material positioned between the handle portions of the pliers.

SUMMARY OF THE INVENTION

It is therefore an object of the present invention to provide lightweight, non-conductive, non-corrosive hand tools such as pliers, channel locks, and screwdrivers, to name a few, which have the durability and strength for use in industrial applications. It is a further object of the invention to provide a means for flotation in water which is both unobstructive and non-burdensome to the user of the hand tools and which does not detract from the aesthetic qualities of the tool.

In one aspect of the present invention, a non-conductive, non-corrosive floating hand pliers is constructed of two lever members, each having a handle end, a gripping end and pivot means operatively interconnecting the lever members intermediate the gripping end and the handle end. At least one of the lever members has an enclosed cavity capable of holding a fluid medium such as nitrogen gas, air, or a low density foam to reduce the overall density of the hand pliers. In another embodiment, a foam, such as polyethylene or chlorosulfanated polyethylene is used as a sheathing material which extends around at least one of the handles to reduce the overall density of the pliers. Additionally, in certain tool configurations, both cavity holding foam or gas may be used in combination with a low density sheathing material to decrease the overall density of the hand tool.

In another aspect of the present invention, the non-conductive floating pliers or channel locks are constructed of a reinforced plastic, fiberglass or similar synthetic material such as Verton® or Isoplast®. These materials provide exceptional strength and durability, yet have an overall lower density than metallic materials or other commonly used low density plastics without reinforcement.

In another aspect of the present invention, the hand pliers utilize a specific geometric shape, including a rigid "I-beam" which enhances the strength of the hand pliers. The I-beam is generally a substantially linear section extending from the pivot means towards the handle end of the pliers. The I-beam has opposing "cut-out" channels which result in reduced material requirements, lower weight and hence lower manufacturing costs, yet allow extreme pressure to be applied to the gripping member of the pliers without significant deflection in the handle end of the hand pliers.

It is a further object of the present invention to provide a cost effective method for manufacturing a floating, non-conductive hand tool. In one embodiment of the present invention the process involves providing a mold with a mold cavity having the desired shape and size of the hand tool. The mold cavity is in communication with a chamber which contains a non-solid synthetic plastic or other type of material. A predetermined volume of the non-solid synthetic plastic is then injected into the mold cavity at a specified temperature and pressure. Prior to cooling, an injection nozzle is inserted into the mold cavity and a specified volume of gas or low density foam is injected into the mold to create a cavity capable of holding the gas or foam and hence reduce the overall density of the pliers. In one embodiment, the gas injection nozzle is removed prior to the complete cooling of the plastic or other material in the mold to create a substantially impermeable gas cavity. The mold is then opened after sufficient cooling and the reduced density hand tool is ejected from the mold.

BRIEF DESCRIPTION OF THE DRAWINGS

FIG. 1 is a plan view of a hand held floating pliers with an enclosed gas cavity within the handle members of the pliers.

FIG. 2 is a plan view of a hand held floating pliers showing a low density sheathing material attached to the handle members of the pliers.

FIG. 3 is a cross-section of line 3—3 of FIGS. 1 and 2 showing the I-beam construction of the lever members.

DETAILED DESCRIPTION

Figure 4:
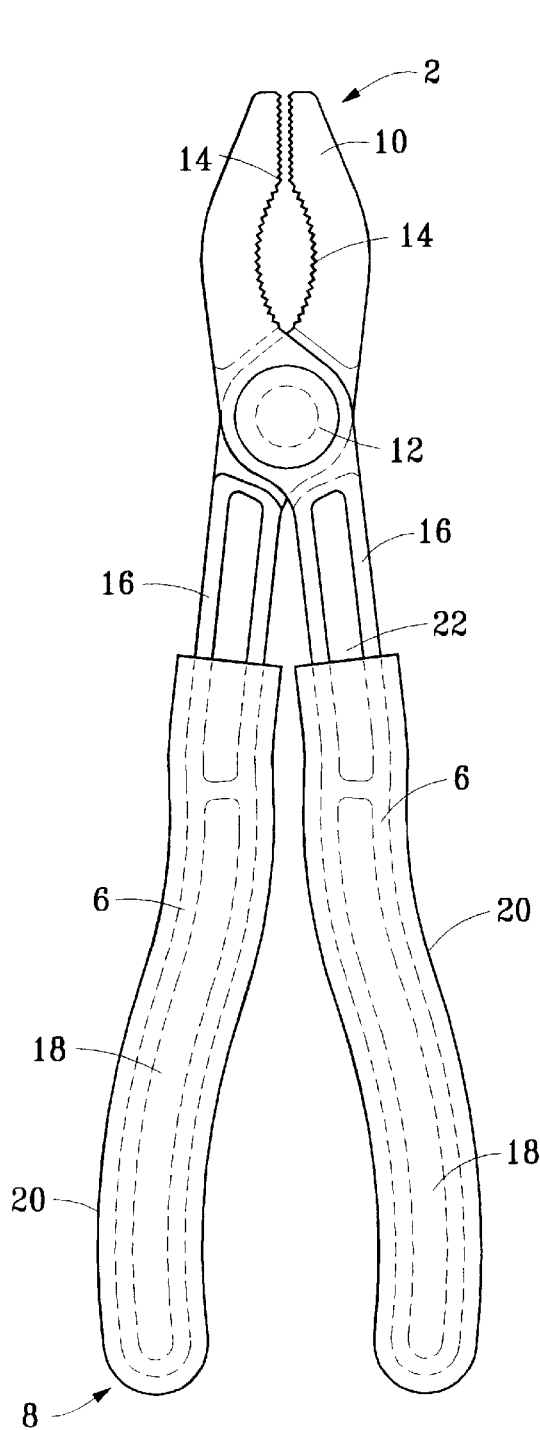
FIG. 4 is a plan view of an alternative embodiment of the hand held pliers of FIG. 1, showing a low density sheathing material used in combination with a gas cavity enclosed within the handle member of the pliers.
Figure 5:
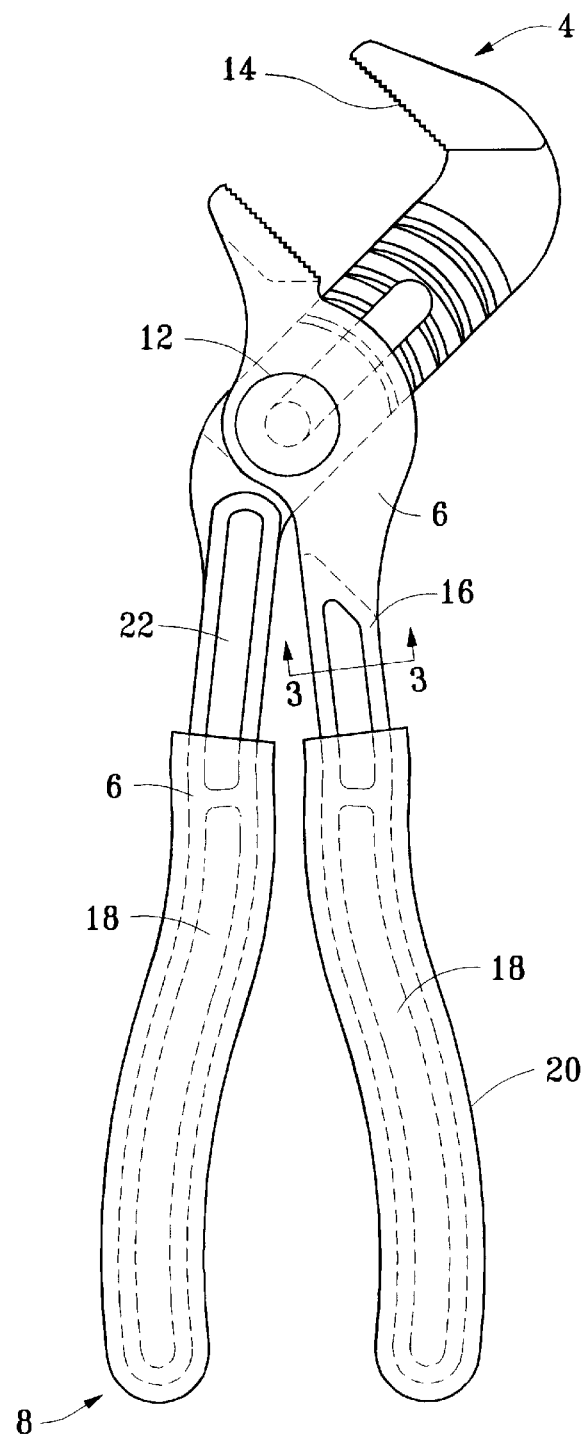
FIG. 5 is a plan view of floatable channel-lock type hand pliers with enclosed gas cavity within the handle members of the pliers.

Referring to FIG. 1, the apparatus constructed in accordance with an embodiment of the present invention is shown by reference numeral 2. An alternative embodiment of the present invention may be seen in FIG. 2. As shown, the apparatus generally comprises two lever members 6, a pivot pin 12, a handle end 8, a gripping end 10, and an enclosed cavity 18 capable of holding a fluid such as a gas or low density foam material. Alternatively, as seen in FIG. 2, a sheathing material 20 such as a low density foam material may be used to enclose all or a portion of the handle end 8 of the tool to reduce the overall density of the tool, thus permitting the hand tool to float.

Thus, in one embodiment of the present invention a lightweight, durable hand tool is provided which has a density low enough to permit the hand tool to float in water. Furthermore, the tool is made of non-conductive materials which significantly reduces the likelihood of a user being shocked or electrocuted when using the tool near or in contact with materials which can conduct electrical current.

Preferably, the hand tools are comprised of a synthetic material such as plastic or fiberglass or other similar light weight non-conductive materials. More preferably, the hand tools are constructed of a durable, lightweight, synthetic material such as Verton® or Isoplast®, which are trademarked materials developed by LNP Plastics and Dow Chemical Company, respectfully. These materials allow the pliers to be used in industrial type applications without significant wear to the gripping teeth 14 located on the gripping end 10 of the hand pliers 2. Further, these materials are extremely rigid, which allows significant force to be applied to an object within the gripping teeth 14 without any significant deflection in the handle end of the pliers.

Preferably, the hand tools are manufactured by an injection molding process. This process allows the hand tool to be manufactured with the aforementioned materials within a high degree of tolerance, but more importantly allows for the creation of a substantially non-permeable cavity 18 within one or more of the lever members 6 of the hand pliers 2. The cavity 18 may be filled with a gas such as carbon dioxide, oxygen, air helium or more preferably, nitrogen, which is readily available and generally inexpensive. Furthermore, the cavity 18 could be filled with a low density foam material such as hydrofoam®, polystyrene, polyethylene or other similar low density materials known in the art. The actual steps of manufacturing the hand tools with the cavity 18 will be described in greater detail below.

Figure 6:
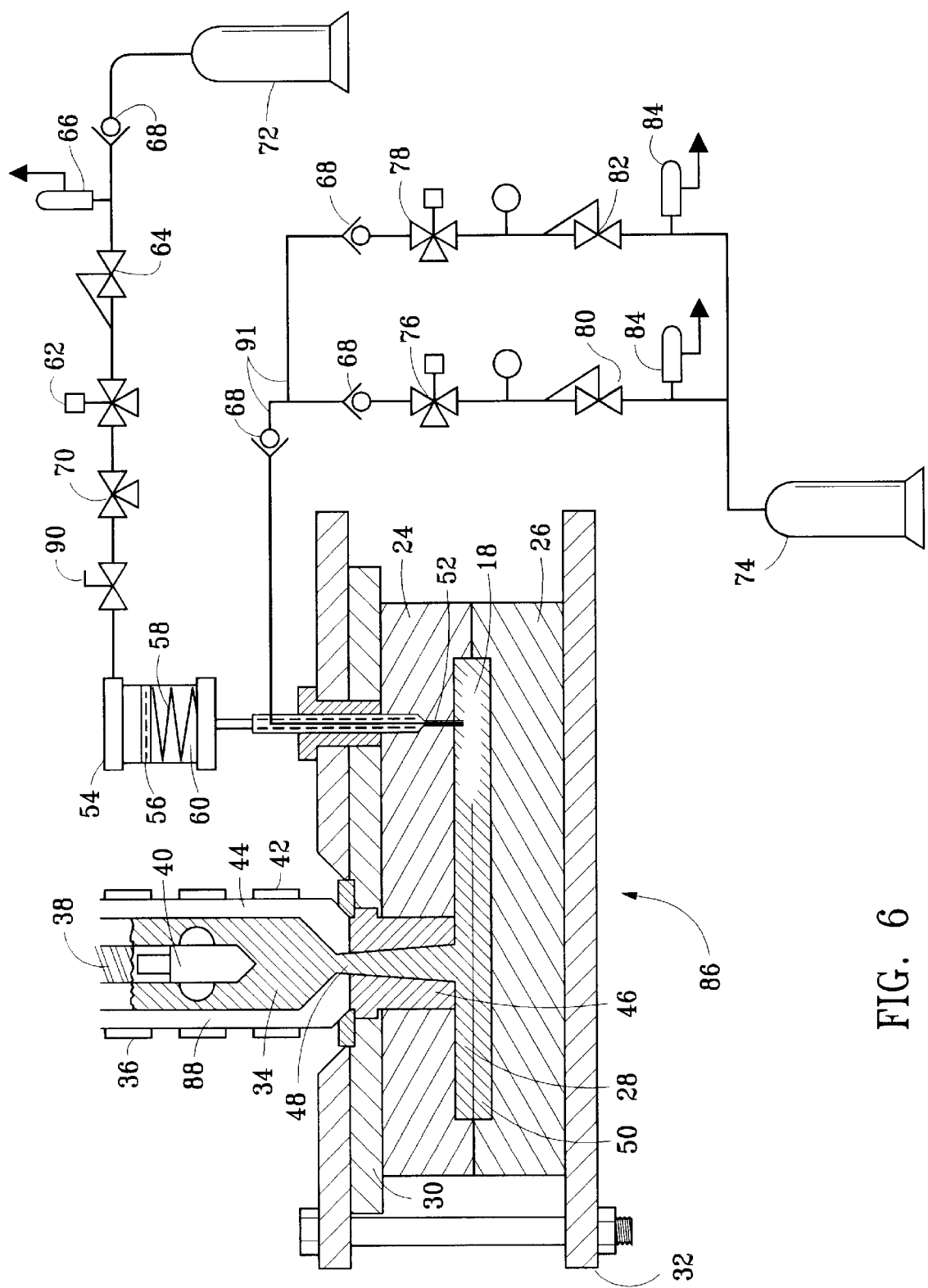
FIG. 6 is a cross-section of a mold apparatus used to create a cavity capable of holding a gas or low density foam.

In another embodiment of the present invention, the hand tools are manufactured without an enclosed cavity, but rather utilize a low density sheathing material 20 such as hypalon, foam rubber, polystyrene, polyethylene or styrofoam® to reduce the overall density to allow the hand tool to float. The low density sheathing material 20 generally has a density of about 15 lbs./ft.$^3$, and more preferably 12 lbs./ft.$^3$. The foam material not only reduces the overall density of the hand tool, but also provides a cushioning effect which helps prevent hand fatigue and irritation after prolonged periods of use. As seen in FIG. 2, the low density sheathing material 20 generally extends around both handle ends 8 of the lever members 6, although depending on the overall density of the hand tool, it may be sufficient to encase only one handle end 8 of the hand pliers 2. Furthermore, depending on the overall density of the hand tool, a low density sheathing material 20 may be used in combination with a fluid cavity 18 as seen in FIG. 4. As seen in FIG. 6, the same type of fluid cavity 18 can be utilized in different tool configurations such as channel locks, screwdrivers, socket sets, etc. (not shown).

The lever members 6 of the hand pliers 2 or channel lock pliers are held together in a pivotable manner with a pivot pin 12. The pivot pin 12 is generally comprised of the same lightweight synthetic material as the durable lever members 6 of the hand pliers 2 which helps reduce the overall weight of the hand pliers 2. The pivot pin 12 is actually comprised of a male end and a female end which are operably engaged by the male end engaging the internal diameter of the female end, which has a slightly larger diameter. The male end and female ends of the pivot pin are generally interconnected by a resin or glue such as Loctite 300 series, Loctite 400 series or alternatively by a plastic ultrasonic or spin welding type process which prevents the two members from becoming disengaged.

In another embodiment of the present invention an "I-beam" geometric configuration is used which significantly enhances the strength of the hand pliers and reduces material costs during manufacturing. The I-beam 16 may generally be seen in FIG. 1–6 and more specifically in FIG. 3, which is a cross section taken at line 3—3 in the aforementioned Figures. The I-beam 16 construction is generally used on the upper one half of the handle ends 8 of the lever members 6 which are in close proximity to the pivot pin 12. The I-beam 16 provides exceptional strength and rigidity to the lever members 6 while reducing material costs. As seen in cross-section FIG. 3, the "I-beam" 16 is generally comprised of opposing channels 22 which are formed in the mold cavity during the manufacturing process. The I-beam channels effectively remove between about 20 and 30 percent of the materials used in a solid, rectangular or round cross-sectional configuration, thus reducing material costs.

Perhaps more importantly, the I-beam 16 configuration utilized in the lever members 6 has been found to provide exceptional strength. For example, in one embodiment of the hand held pliers shown in FIG. 2 and FIG. 3 which has an I-beam member with a cross-sectional thickness X of 0.5 inches, a Y dimension of 0.435 inches, and a Z dimension of 0.2 inches, a force of at least about 170 lbs. was applied across the entire gripping end 10 surface area of the hand pliers by applying a force of 80 lbs. to the handle ends 8 of pliers. With this applied force, the total deflection d (FIG. 2) between the handles of the pliers was 1.5 inches. Thus, each individual lever member 6 deflected a total distance of about 0.75 inches. As the thickness of the I-beam 16 increases, the deflection between the hand held pliers 2 gripping members decreases. For example, if the I-beam 16 X dimension is increased 0.025 inches and the Y dimension 0.025 inches, the stiffness of the lever members 6 is increased 25%. Thus, if the total force applied to the handle end 10 is again 80 lbs., the total maximum deflection d between the handle ends 10 of the lever members 8 is reduced to about 0.8625 inches (0.43 inches per lever member 6), as opposed to the 1.5 inches in the previous example. Thus, depending on the application, it is possible to construct lightweight, durable pliers with substantial strength depending on the thickness of the lever member 6 and "I-beam" 16.

It is a further aspect of the present invention to provide a process for manufacturing a non-conductive hand tool which has a cavity within the hand tool to reduce the density of the tool sufficiently to permit the tool to float in water. This cavity may be filled during the manufacturing process to either contain a gas such as air or nitrogen, or a low density foam to reduce the overall density of the hand tool. In some designs utilizing heavier tools, it may be necessary to utilize the fluid cavity in conjunction with a low density sheathing material which incases the handle ends 8 of the tool. Referring now to FIG. 6, an apparatus is provided which generally depicts a device for injection molding a hand tool and creating a cavity capable of holding a gas or foam.

Referring now to FIG. 6, a mold assembly 86 is provided for the use in an injection molding process press that has a top mold plate 24 and a bottom mold plate 26 with a mold space located 28 therebetween. The top mold plate 24 is mounted to the molding press fixed platen 30, while the bottom mold plate 26 is mounted to a molding press moveable platen 32 with a hydraulic clamp (not shown). Molten composite plastic 34 is introduced into the mold space 28 by a heated feed barrel 36 which contains a hydraulic feedscrew 38 with a non-return valve 40, nozzle adapter 42, and heated nozzle 44. The composite plastic 34 material enters the mold space 28 through the sprue 46 and a runner 48.

During the molding cycle a fluid cavity 18 is created in the molded component 50 to contain a gas or low density foam to reduce the density of the molded component 50 to allow flotation. This fluid cavity 18 is created by introducing a fluid under pressure at a selected position generally parallel to the entry point of the runner 48 into the mold space 28. A fluid injection passageway 52 pneumatically extends through the top mold plate 24, into the molded component 50 to about one third to one half of the distance of the mold cavity 28 depth.

To pneumatically extend the fluid injection passageway 52, a pneumatic actuator 54 is provided which has a piston 56, fail-safe return spring 58, and cylinder 60 connected to the fluid passageway 52 which serves to extend and retract the fluid passageway 52 via the electric solenoid valve 62. A pressure reducing valve 64, pressure safety relief valve 66, non-return valve 68, quick release valve 70, speed control valve 90 and pneumatic gas supply 72 are further provided to facilitate the injection of the fluid.

To transmit the gas through the fluid injection passageway 52 and into mold space 50, there is provided an injection gas supply 74 connected to the fluid injection passageway 52 via the hi-pressure fast acting solenoid valve 76 and the lo-pressure fast acting solenoid valve 78. Downstream of the hi-pressure flow regulator valve 80 and the lo-pressure flow regulator valve 82, the fluid supply line 91 has non-return valves 68 to ensure that neither the gas nor molten plastic material impinges into the fluid supply line 91. The gas pressure flow regulator valves 80 and 82 provide the means to deliver a predetermined volume of fluid such as a gas or foam at the required pressures to the fluid injection passageway 52. The gas pressure flow regulator valves 80 and 82 are calibrated to deliver the necessary volume of gas or foam to be injected to create the fluid cavity 18 to effectively reduce the weight of the molded plastic product and allow flotation. The prescribed volume of fluid injected into the molded component 50 is controlled by the hi-pressure fast acting solenoid valve 76 and the lo-pressure fast acting solenoid valve 78, and is protected by the non-return valves 68 and pressure safety relief valves 84.

In operation, the injection chamber 88 of the plastic feed barrel 36 is filled with composite plastic 34 material to form a molten product for injection. The upper mold plate 24 and lower mold plate 26 are subsequently closed, and pressure applied by the hydraulic clamp (not shown) to the moveable platen 32. During this process, the pneumatically extended fluid injection passageway 52 is in the fail-safe retracted position. During this stage, the electric solenoid valve 62 is de-energized and the pneumatic quick release valve 70 is in a normal, non-injection position. The pressure reducing valve 64 is calibrated to deliver the gas pressure required to fully compress the actuator spring 58 and to overcome the forces acting on the fluid injection passageway 52. The pressure safety relief valve 66 is calibrated to relieve at a pressure less than the safe operating pressure of the pressure reducing valve 70, and the speed control valve 90 is calibrated to control the rate that the fluid injection passageway 52 is drawn from the composite molten plastic 34 material.

The hydraulic clamp pressure switch (not shown) and proximity switch (not shown) are tripped simultaneously, indicating that full clamping tonnage is applied to the mold assembly 86 and that the mold position is correct to begin the molding process. The heated molten composite plastic 34 material in the injection chamber 88 is introduced into the mold space through the heated nozzle 44, sprue 46, and runner 48 by the hydraulic feedscrew 38. The heated composite plastic 34 material fills the mold cavity 28 during the primary and secondary injection cycles. As the primary injection cycle is completed, the secondary injection cycle begins closing a relay (not shown) that energizes the electric solenoid valve 62 which delivers gas pressure to the pneumatic actuator 54 and cylinder 60 and forces the gas piston 56 to compress the fail-safe spring 58 and fully extend the fluid injection passageway 52 into the heated molten composite plastic 34 material in the mold cavity 28.

During the primary injection cycle solenoid valves 76 and 78 are closed, the gas pressure flow regulator valves 80 and 82 are calibrated and ready for the secondary injection cycle and cooling cycle. The pressure safety relief valves 84 are calibrated to relieve at a pressure below the safe operating pressure for the gas pressure flow regulator valves 80 and 82.

The secondary injection cycle begins by closing a relay (not shown) and energizing the pressure fast acting solenoid valve 76, which delivers a predetermined volume of fluid at a specified pressure to the heated molding, thus clearing the injection port 52 of molten plastic, while initiating the formation of the fluid cavity 18. The secondary injection cycle terminates, opening the previously mentioned relay (not shown) and de-energizing the lo-pressure fast acting solenoid valve 78, thus beginning the cooling cycle.

Following completion of secondary injection cycle, the cooling cycle is initiated by a time delay relay (not shown) which is calibrated to optimize the open and close cycle of the hi-pressure fast acting solenoid valve 78, whereby the formation of the fluid cavity 18 is completed. As the electric solenoid valve 62 is closed, the fluid injection passageway 52 closes in the retracted position, thus drawing the shrinking composite molten plastic 34 material behind the injection port 52 at a sufficiently slow rate as controlled by the speed control valve 90, thus sealing the fluid in the fluid cavity 18 and reducing the weight of the molded component sufficiently to permit flotation.

It is common knowledge that plastic material and especially composite plastic material will shrink during the cooling phase. The timing and sequence of events provided herein allows the hotter, more molten liquid phase composite plastic to be drawn from the inner core of the molding out to the cooler, contracting exterior by the fluid injection passageway 52 as it fails to the retracted position at a controlled rate dictated by the speed control valve 90.

The fluid cavity 18 is contained as the cooling cycle completes and while the hydraulic clamping pressure is maintained until the molded component 50 and the sprue 46 have solidified sufficiently to ensure the molded component 50 has sustained the form and finish dictated by the mold surfaces. Once the cooling phase is completed and the hydraulic clamping pressure relieved from the moveable platen 32, a pressure switch (not shown) is tripped that engages the clamp retract cycle, opening the mold assembly 86, driving the mold ejector pins (not shown) forward, thus forcing the finished molded component 50 from the mold cavity 28 and beginning a new molding cycle.

The foregoing description of the present invention has been presented for purposes of illustration and description. The description is not intended to limit the invention to the form disclosed herein. Consequently, the inventions and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention, it is intended that the appended claims be construed to include all alternative embodiments as permitted by the prior art.

Furthermore, for purposes of illustration and clarity, the following component numbering is provided which corresponds with the attached drawings herein: hand pliers 20 low density sheathing material

| | |
|---|---|
| 02 | hand pliers |
| 04 | channel lock pliers |
| 06 | lever member |
| 08 | handle end |
| 10 | gripping end |
| 12 | pivot pin |
| 14 | gripping teeth |
| 16 | I-beam |
| 18 | fluid cavity |
| 20 | low density sheathing material |
| 22 | I-beam channels |
| 24 | top mold plate |
| 26 | bottom mold plate |
| 28 | mold space |
| 30 | molding press fixed platen |
| 32 | molding press moving platen |
| 34 | molten composite plastic |
| 36 | plastic feed BBL |
| 38 | hydraulic feedscrew |
| 40 | non return valve |
| 42 | nozzle adapter |
| 44 | heated nozzle |
| 46 | sprue |
| 48 | runner |
| 50 | molded component |
| 52 | fluid injection passageway |
| 54 | pneumatic actuator |
| 56 | gas piston |
| 58 | fail safe return spring |
| 60 | cylinder |
| 62 | solenoid valve |
| 64 | pressure reducing valve |
| 66 | pressure relief valve |
| 68 | check valve |
| 70 | quick release valve |
| 72 | pneumatic gas supply |
| 74 | injection gas supply |
| 76 | low pressure solenoid valve |
| 78 | high pressure solenoid valve |
| 80 | high pressure flow regulating valve |
| 82 | low pressure flow regulating valve |
| 84 | pressure safety valves |
| 86 | mold assembly |
| 88 | injection chamber |
| 90 | speed control valve |
| 91 | fluid supply line |

What is claimed is:

1. A lightweight, substantially non-conductive floating hand pliers, comprising:

two lever members each having a handle end, a gripping end, and pivot means operatively interconnecting said lever members intermediate said gripping end and said handle end, at least one of said lever members having an enclosed substantially impermeable cavity for holding a gas or low density fluid, wherein said pliers have a total density less than water.

2. The hand pliers of claim 1, wherein said gas comprises air, nitrogen, helium, oxygen, carbon dioxide, or combinations thereof.

3. The hand pliers of claim 1, wherein said cavity contains a low density foam material.

4. The hand pliers of claim 1, wherein said lever members are comprised of plastic, fiberglass, or combinations thereof.

5. The hand pliers of claim 1, wherein said lever members are comprised of Verton®.

6. The hand pliers of claim 1, wherein said lever members are comprised of Isoplast®.

7. The hand pliers of claim 1, wherein said lever members and said pivot means are comprised of Verton®.

8. The hand pliers of claim 1, wherein a force of at least about 170 lbs may be applied to an object located between said gripping ends of said pliers without deflecting each of said handle ends greater than 0.75 inches from a non force applying position when said lever members have a thickness no greater than 0.5 inches.

9. The hand pliers of claim 1, wherein said gripping end of said lever members further comprise an I-beam member interconnected to a handle member, said I-beam member having a first end proximate said pivot means and a second end interconnected to a first end of said handle member, said I-beam member having at least two opposing sides with a channel.

10. The hand pliers of claim 1, wherein said pivot means comprise opposing interconnecting pins which operatively extend through each of said lever members, wherein said lever members pivot between a first open position and a second closed position.

11. The hand pliers of claim 1, wherein said gripping ends of said lever members have serrated surfaces for holding an object.

12. The hand pliers of claim 1, wherein said gripping ends are at least partially comprised of a ceramic, metallic or resin material with a hardness greater than said lever members.

13. A floating, non-conductive hand tool, comprising:

a body portion and a tool portion, said body portion having a first end, a second end, and an exterior surface, at least one of said ends having attachment means for interconnection to said tool portion, said body portion having an enclosed, substantially impermeable cavity within said exterior surface which contains a gas or low density fluid, wherein said non-conductive tool has an overall density less than fresh water.

14. The floating hand tool of claim 13, wherein said cavity is filled with a low density foam.

15. The floating hand tool of claim 15, wherein said tool further comprises a low density sheathing material which substantially encases at least a portion of said body portion of said tool, said low density sheathing material interconnected to said body portion in a manner which does not obstruct any normal range of motion associated with the use of said floating, non-conductive hand tool.

16. The hand tool of claim 13, wherein said body portion is comprised of plastic, fiberglass, Verton®, Isoplast® or combinations thereof.

17. A lightweight, substantially non-conductive non-corrosive hand pliers, comprising:

two non-metallic lever members each having a handle end, a gripping end and pivot means operatively interconnecting said lever members between said gripping ends and said handle ends; and a low density sheathing material substantially enclosing said handle end of at least one of said lever members, wherein said pliers has a density less than water and a non-obstructed range of motion between a first open position with said gripping ends of said lever members in a spaced apart relationship and a second closed position with said gripping ends of said lever members in operable contact with one another.

18. The hand pliers of claim 17, wherein said lever members are comprised of plastic, fiberglass, or combinations thereof.

19. The hand pliers of claim 17, wherein said lever members are comprised of Verton®.

20. The hand pliers of claim 17, wherein said low density sheathing material is comprised of polystyrene, chlorosulfunated polyethylene, or polyethylene.

21. The hand pliers of claim 16, wherein a force of at least about 170 lbs. may be applied across the gripping ends of said lever members without deflecting each of said handle ends more than about 0.75 inches from a non-force applying position when said lever members have a thickness no greater than 0.5 inches.

22. The hand pliers of claim 17, wherein said pliers have a density less than water, wherein said pliers float.

23. The lightweight, substantially non-conductive floating hand pliers of claim 1, further comprising:

a low density sheathing material substantially enclosing said handle end of at least one of said lever members, wherein said hand pliers has a non-obstructed range of motion between a first open position with said gripping ends of said levers in a spaced apart relationship and a second closed position with said gripping ends of said lever members in operable contact with one another.

* * * * *